United States Patent [19]

Ostertag et al.

[11] Patent Number: 5,244,649

[45] Date of Patent: Sep. 14, 1993

[54] PRODUCTION OF HEMATITE PIGMENTS IN THE FORM OF PLATELETS

[75] Inventors: Werner Ostertag, Gruenstadt; Christoph Schwidetzky, Hassloch; Norbert Mronga, Dossenheim, all of Fed. Rep. of Germany

[73] Assignee: BASF Aktiengesellschaft, Ludwigshafen, Fed. Rep. of Germany

[21] Appl. No.: 571,512

[22] Filed: Aug. 23, 1990

[30] Foreign Application Priority Data

Sep. 13, 1989 [DE] Fed. Rep. of Germany ....... 3930601

[51] Int. Cl.$^5$ ............................................. C01G 49/06
[52] U.S. Cl. .................................... 423/633; 423/592; 423/594; 106/415; 106/456; 106/459
[58] Field of Search ............... 423/633, 592, 594; 106/459, 415, 456

[56] References Cited

U.S. PATENT DOCUMENTS

| | | | |
|---|---|---|---|
| 3,987,156 | 10/1976 | Nobuoka | 423/633 |
| 4,289,746 | 9/1981 | Hayakawa et al. | 423/633 |
| 4,373,963 | 2/1983 | Uenishi et al. | 106/304 |
| 4,376,656 | 3/1983 | Senda et al. | 106/309 |
| 4,404,254 | 9/1983 | Franz et al. | 423/633 |
| 4,676,838 | 6/1987 | Franz et al. | 106/456 |
| 4,826,537 | 5/1989 | Ostertag | 106/459 |

FOREIGN PATENT DOCUMENTS

| | | |
|---|---|---|
| 0014382 | 8/1980 | European Pat. Off. |
| 068311 | 6/1985 | European Pat. Off. |
| 180881 | 5/1986 | European Pat. Off. |
| 265820 | 5/1988 | European Pat. Off. |
| 0293746 | 12/1988 | European Pat. Off. |
| 541768 | 12/1931 | Fed. Rep. of Germany |
| 2056042 | 5/1971 | Fed. Rep. of Germany |
| 3019404 | 11/1983 | Fed. Rep. of Germany |
| 638200 | 5/1928 | France |
| 49-044878 | 11/1974 | Japan ................ 106/456 |
| 2028784 | 3/1980 | United Kingdom |

OTHER PUBLICATIONS

Derwent Publications, Abstract of JP 57057755 (Sep. 26, 1980).

Primary Examiner—Michael Lewis
Assistant Examiner—N. M. Nguyen
Attorney, Agent, or Firm—Keil & Weinkauf

[57] ABSTRACT

Iron oxides in the form of platelets are produced by hydrothermal treatment of aqueous suspensions containing iron(III) hydroxide or oxide hydrates in the presence of alkali metal hydroxides and of aluminum and/or silicon compounds in two stages. The normality of the alkali is from 0 2 to 2 N in the first stage and is increased by from 0.2 to 2.5 in the second stage.

The two-stage process according to the invention makes it possible to produce hematite pigments which are in the form of platelets, have increased luster, larger particle diameter, improved dispersibility and color hues which can be adjusted as desired.

4 Claims, No Drawings

PRODUCTION OF HEMATITE PIGMENTS IN THE FORM OF PLATELETS

The present invention relates to a process for producing hematite pigments which are in the form of platelets, have increased luster, larger particle size, improved dispersibility and color hues which can be adjusted as desired, by means of a two-stage hydrothermal process.

Synthetic iron oxide pigments in the form of platelets have recently attracted interest as special effect pigments for coloring surface coatings, plastics and ceramic materials, in printing and in decorative cosmetics. Crucial for the visual effect of the pigments are the particle size and the smooth surfaces, which determine the luster, of the iron oxide particles.

In contrast to color pigments, whose visual effect is based on absorption and scattering, the visual effect of the special effect or luster pigments is mainly based on directed reflection at oriented pigment particles in the form of platelets.

Special effect pigments with particle diameters from 5 to 12 $\mu$ display a silky luster, while those with a particle diameter above 12 $\mu$ glitter in a characteristic manner. The mean particle diameter desirable for special effect pigments depends on the application and is from 5 to 20 $\mu$. The platelet diameter is defined as the maximum dimensions of the platelets.

Developments to date in synthetic iron oxide pigments in the form of platelets have aimed at producing pigments with a higher mean platelet diameter and improved luster. Although the color is of minor importance in special effect pigments, it is also desirable to adjust the color hue of the iron oxide pigments. Lightened pigments are particularly interesting because of the variety of possible color mixing.

The production of $\alpha$-$Fe_2O_3$ pigments in the form of platelets by hydrothermal treatment of iron hydroxide or iron oxide hydrate in alkaline aqueous medium is described in the earlier specifications FR-B-638 200, DE-B-541 768 and 658 020, GB-A-20 28 784, DE-A-30 19 404 and DE-A-20 56 042. The resulting products do not meet the requirements of a color pigment and can be used, at best, for corrosion protection because of their barrier effect. In practice, these products have never achieved importance as color pigments.

EP-B-00 14 382 describes iron oxide pigments which are in the form of platelets and contain in solid solution at least one of the oxides of elements in groups IVa and b, Va and b and/or VIa and b and/or IIb of the periodic table. These pigments are obtained by hydrothermal treatment in the presence of the compounds of the particular elements, resulting in platelets with a higher ratio of diameter to thickness and improved luster. However, the products can be produced, if at all, only at great expense, e.g. excessively long holdup time in the reactor during the hydrothermal synthesis, with a mean particle diameter of 10 $\mu$m or above.

EP-A-0 180 881 describes a process for producing doped $\alpha$-$Fe_2O_3$ pigments in the form of platelets with a mean particle diameter of up to 20 $\mu$ and a mean diameter to thickness ratio of 20 to 100, the particular feature of this being the addition of specially prepared active $\alpha$-iron oxide seeds in the shape of platelets to the initial suspension containing iron(III) hydroxide before the hydrothermal treatment. The disadvantage of this process is the special step, which proceeds the hydrothermal reaction, for preparing these active $\alpha$-iron oxide seeds, which is technically demanding, complicates the overall process and results in agglomerate-containing product.

In JP-A-80 016 978, $\alpha$-iron oxides which are in the form of platelets and themselves derive from a hydrothermal reaction are employed as seeds for producing pigments which are in the form of platelets and have a uniform particle size distribution. However, this procedure, like the abovementioned process, leads to the formation of numerous undesired agglomerates, so that pigments produced in this way are not suitable for high-quality applications.

EP-B-0 068 311 and U.S. Pat. No. 4,373,963 describe high-luster pigments which are in the form of platelets and have the composition $Al_xFe_{2-x}O_3$ for $x=0.02-0.5$. They can also be produced with a relatively large mean particle diameter in reaction times $<1$ h. The pigments are obtained in a hydrothermal reaction from an aqueous suspension of iron(III) hydroxide or oxide hydrate, sodium aluminate and sodium hydroxide solution. These pigments, in contrast to the hematite pigments in the form of platelets which have been described hitherto, have a lightened color hue which allows color mixing, and have comparatively high diameter to thickness ratios of the individual particles. In synthesis times of less than 1 h, which are industrially realistic and economically viable and which are suitable, for example, for a tube reactor, it was possible to synthesize pigments with a mean diameter of up to 12 $\mu$. In the processes described above, which produce hematite pigments which are in the form of platelets and which contain other ions in addition to iron, the incorporation rate and thus the particle size of the pigments depends greatly on the reaction parameters, which influence one another, and an increase in the size of the pigment particles to be produced is necessary at the expense of, in particular, increasing alkali contents and holdup times in the hydrothermal synthesis, but this involves technical problems, e.g. because of the associated increase in corrosion, unless more corrosion-resistant and costly materials are used for the pressure equipment.

EP-A-0 265 820 describes pigments which are in the form of platelets and have the composition $Mn_xAl_yFe_{2-(x+y)}O_3$ where x is from 0.01 to 0.06 and y is from 0 to 0.2, it being possible to obtain relative large platelet diameters in short synthesis times. The pigments are produced by hydrothermal treatment of aqueous suspensions which contain iron hydroxide or oxide hydrate and alkali and a soluble manganese compound and, where appropriate, sodium aluminate. The addition of manganate or permanganate makes it possible, surprisingly, to adjust the diameter of the pigment particles to from 8 to 50 $\mu$m without the need for the normality of the alkali to exceed 2N. The platelets can also be produced with a very high diameter to thickness ratio of about 100. However, the pigments are relatively dark brown, which restricts the possibilities of color mixing.

In summary, it can be said that the predominant aims with the synthetic hematite pigments disclosed to date have been to increase the main diameter of the platelets and the luster, and that these have been achieved by changing the reaction parameters to only a limited extent and at the expense of other disadvantages.

Hence it was an object of the present invention to provide a process for producing iron oxides in the form of platelets by hydrothermal treatment of aqueous suspensions containing iron(III) hydroxide or oxide hydrates in the presence of alkali metal hydroxides and of aluminum and/or silicon compounds, in which the diameter of the particles, and thus their luster, is increased at comparatively low normalities of alkali.

We have found that this object is achieved by carrying out the hydrothermal treatment in two stages, with the proviso that the normality of the alkali is from 0.2 to 2N in the first stage and is increased by from 0.2 to 2.5 in the second stage.

Suitable starting materials for producing the pigments are the hydroxides and oxide hydrates of iron. Iron oxide hydrate is in fact preferable to iron hydroxide because pigment-like FeOOH is considerably better defined and has considerably more favorable technical properties than gel-like Fe(OH)$_3$. Suitable starting materials are all known crystallographic modifications of iron oxide hydrate, e.g. $\alpha$-, $\beta$- and $\gamma$-FeOOH.

Concerning the Al-containing starting material, apart from alkali metal aluminate, it is possible to employ aluminum hydroxide and the known aluminum oxide hydrates boehmite and bayerite and soluble aluminum salts. Aluminum oxide can also be employed because, as is known from the Bayer digestion, it is converted into aluminate under hydrothermal conditions in the presence of alkali.

Examples of suitable silicon-containing starting materials are silicon dioxide or alkali metal silicate or else silicon compounds which are hydrolyzed in the alkaline reaction medium, e.g. esters of silicic acid.

The suspensions to be subjected to the hydrothermal treatment in the first stage contain alkali metal hydroxides, preferably NaOH and/or KOH, in a concentration of from 0.2 to 2N. If, in place of alkali metal aluminate, there are used aluminum compounds which are converted by the alkali into aluminate under the reaction conditions, the amount of alkali required for this must be taken into account. The same applies to the use of silicon compounds which are hydrolyzed in the alkaline reaction medium.

Another important parameter in the process for producing the pigments is the temperature, because there is a minimum temperature for each suspension of starting materials with a particular composition and a predetermined time, below which the hydroxides or oxide hydrates are not dehydrated to oxides. It is best to determine this minimum reaction temperature experimentally for each particular circumstance. A series of experiments has shown that it is always above 170° C. The reaction temperature is expediently chosen to be in the range from 250° to 360° C. because this ensures that the reaction takes place at a rate which is industrially worthwhile, i.e. less than 1 h for example.

The reaction temperature can be lowered by increasing the holdup time of the suspension. Thus, a particular suspension of starting materials was used to show that reaction temperatures of 310°, 300°, 285°, 275°, 270° and 260° C. correspond to holdup times of 1, 10, 120, 600, 1200 and 2400 min.

Apart from the temperature and holdup time, the concentration of solids (iron compounds) in the suspension of the starting materials also plays a part, although minor. In general, the concentration of starting materials is chosen so that the suspension has a solids content of from 1 to 20, expediently of from 1 to 10%, by weight. In the range from 1 to 10% by weight the flow properties of the suspension of starting materials are such that industrial manipulation of the suspension is straightforward.

After the reaction is complete, i.e. after the iron-containing starting material has been converted into iron oxide pigment (hematite) in the form of platelets, the second stage is carried out by adding further alkali metal hydroxide solution to the suspension so that the normality of alkali is increased by from 0.2 to 2.5N. However, an alternative procedure is to separate the hematite pigments in the form of platelets from the liquid and, expediently before drying, to add alkali of a normality which is from 0.2 to 2.5N above the normality of the original suspension.

However, it is particularly advantageous in terms of industrial production to increase the alkali concentration in the suspension containing platelet pigments immediately after the formation of the pigment, for example by pumping concentrated alkali, especially NaOH or KOH, into the reaction autoclaves.

It is also possible to use lower temperatures in the second stage than in the first stage. The rate of platelet growth and of the development of smooth surfaces increases with the temperature of the hydrothermal treatment in the second stage, which is expediently carried out at from 150° to 360° C.

The concentration of the hematite pigment in the alkaline solution from the second stage can be any desired value, and its upper limit is determined only by the stirrability of pumpability of the suspension. The solids concentration is, as it is in the first stage, expediently from 1 to 20, advantageously 1 to 10%, by weight. Completion of the treatment in the second stage is followed by cooling. The pigments are filtered off from the solution, washed and dried.

The treatment time in the second stage is expediently, for economic reasons, less than 1 h. Longer treatment times are possible. Nor is there any limitation to hematite pigments synthesized in less than 1 h in the first stage. Experiments have shown that the second stage is just as effective for hematite pigments synthesized over several hours in the first stage.

The change in the mean particle diameter as a result of the treatment in the second stage can be followed by Cilas granulometry.

The change in the luster can be determined by measuring the lightness L* at two different angles in a color-measuring instrument. The luster is directly related to the value of $$\frac{L^{*}25° - L^{*}45°}{L^{*}25°} \cdot 100$$

where L*25° and L*45° are the L* values measured at 25° and 45°.

Particle growth and increase in luster can be followed by scanning electron microscopy. Scanning electron micrographs generally provide useful information on the size of pigment particles and the quality of the surface of the oxide platelets. However, these methods are more suitable for quantifying the effects achieved in the second stage.

Investigations on the hematite pigments obtained in the second stage show a distinct effect on the diameter and surface of the particles. The pigment particles are then larger, and their surfaces are smoother and more regular. Small particles or irregularities, which cause scattering and interfere with the visual effect of the pigments, on the surface of the particles disappear. This is surprising inasmuch as comparative experiments have shown that there is only a minimal effect on the particle size and luster when the synthesis of the hematite pigments in the form of platelets is followed immediately by a hydrothermal treatment for a corresponding time without changing the alkalinity of the suspension.

The process according to the invention is surprising because the effect achieved in the two-stage process according to the invention is not attainable by synthesis at a higher alkali concentration in only one stage. Hematite platelets synthesized at high alkali concentration are thicker and have less hiding power and, as ingredient of a surface coating, they confer less gloss than the pigments produced according to the invention; their colors and compositions are also different.

Pigments which contain aluminum and/or silicon and are in the form of platelets lose Al and/or Si during the hydrothermal treatment with a pure alkali in the second stage. This effect is not necessarily undesirable. However, if desired, the loss of $Al_2O_3$ or $SiO_2$ from the pigments can easily be prevented by adding aluminum and/or silicon compounds to the alkali.

Another important advantage of the procedure according to the invention is the possibility of modifying the composition of the solid, at least on the surface of the pigments, by making additions in the second stage. The additions can be made at any desired time during the second stage. They should be soluble in alkali.

Thus, we have found that additions of $SiO_2$, $ZrO_2$, $B_2O_3$ $P_2O_5$ or further $Al_2O_3$ are able substantially to prevent agglomeration of the pigments and improve the dispersibility of the hematite pigments in the form of platelets when used in surface coatings, plastic or other binders. Apart from the oxides, it is possible to use other compounds of the relevant elements as long as they are soluble in alkali.

We have also found that the color hue of the hematite pigments can be influenced by additions such as $Na_2CrO_4$, $Na_2MoO_4$, $KMnO_4$, $Na_2WO_4$ or mixtures thereof during the second stage. Analysis has shown that in such cases the elements Cr, Mo, Mn, Ti or W are incorporated in the surface of the hematite platelets, which provides the possibility of adjusting the color hue as required.

In the second-stage treatment, $SiO_2$ or waterglass occupies a special position inasmuch as the presence thereof leads to diffusion of $SiO_2$ into the hematite particles. It occupies not just the surface. Although it improves the luster only slightly, addition of waterglass is of interest because it prevents aggregation or agglomeration of the pigment.

The surface modifications described here do not rule out additional coating with organic agents. In fact, agents such as carboxylic acids, phosphoric acids or silanes are often applied more easily owing to the surface modification according to the invention.

The two-stage process according to the invention makes it possible to produce hematite pigments which are in the form of platelets, have increased luster, greater particle diameter, improved dispersibility and color hues which can be adjusted as required.

The examples provide further details.

The Cilas values stated in the examples were determined as volume distribution using a commercial Cilas 715 granulometer.

The luster was measured with a Data Color goniophotometer with a Zeiss GK 111 pickup. The luster values which are given were determined as described above from the lightness L* measured at two angles as follows $$\frac{L^{*}25^{\circ} - L^{*}45^{\circ}}{L^{*}25^{\circ}} \cdot 100$$

The angles of 25° and 45° are those between the glancing angle (reflected beam) and the observer's line of sight.

All the measurements were carried out on airdried base coatings which were pigmented with 10% by weight pigment and were applied using a 200 μ knife.

In the examples, percentages are by weight unless otherwise noted.

EXAMPLE 1 a) Stage 1

An aqueous suspension containing 58 g/l FeOOH (BET specific surface area 45 m²/g), 38.0 g/l NaOH and 32.6 g/l γ-$Al_2O_3$ is made up in a stirred vessel. The suspension equals 0.95 normal in sodium hydroxide solution.

The homogeneous suspension is pumped at 37 kg/h through a tube reactor which has an internal diameter of 30 mm and is 45 m long. The tube reactor is heated with oil at 330° C. over a length of 35 m, and the final 10 m are cooled in water. The suspension discharged from the reactor is filtered, and the solid is washed first with 1 N NaOH at 80° C. and then with water.

The solid product has the composition $Al_{0.2}Fe_{1.8}O_3$ and a mean particle diameter of 3.8 μ. The L* values at 25° and 45° were 59.8 and 47.7, from which the luster value is calculated as 20.2.

b) Stage 2

10 g (based on dry matter) of the hematite pigment in the form of platelets from Stage 1, which has been filtered off, washed but not dried, are mixed with 140 g of 1.5 N aqueous sodium hydroxide solution in a 300 ml stirred autoclave and heated to 330° C. in 15 min. The mixture is then stirred at this temperature for 30 min and subsequently cooled to 100° in 13 min, and the pigment is filtered off, washed with $H_2O$ and dried at 20° C.

Under the scanning electron microscope, the pigment obtained in the second stage has much smoother surfaces than that obtained in the first stage. It has a mean particle diameter of 5.4 μ. The L* values at 25° and 45° are 60.5 and 37.2, from which the luster value is calculated as 38.5. The color values measured at 45° are $C_{ab}=21.7$ and $H^o=32.7$.

c) Comparative Example 150 ml of the suspension discharged from the tube reactor in the production of the pigment in Stage 1 are introduced into a 300 ml stirred autoclave and heated to 330° C. in 15 minutes. The mixture is then stirred at this temperature for 30 min and subsequently cooled to below 100° C. in 13 min, and the pigment is filtered off, washed and dried at 120° C.

The resulting product has a mean particle size of 4.0 μ. The luster value is 25.

EXAMPLE 2 a) Stage 1

1 cbm of water, 59 kg of α-FeOOH (BET specific surface area 41 m²/g), 40 kg of NaOH and 31.1 g of γ-$Al_2O_3$ are introduced into a stirred vessel, the alkali concentration in the suspension being 1N.

The suspension is then pumped at a constant rate of 42 kg/h through a tube reactor with an internal diameter of 30 mm and a length of 45 m. The tube reactor is heated with oil at 330° C. over the first 35 m, and the remaining 10 m are cooled with water.

The discharged suspension is filtered and washed as in Example 1, Stage 1.

Scanning electron micrographs show that the resulting solid product is composed of thin platelets. Measurements in a Cilas granulometer reveal that the mean particle diameter is 10.8 $\mu$. The L* values measured at 25° and 45° are 66.8 and 40.78, from which the luster value is calculated as 39.0. The X-ray lines of the product are typical of hematite. Analysis showed 3.0% Al and 65.8% Fe.

b) Stage 2

10 g (based on dry matter) of the pigment from Stage 1, which has been filtered off and washed but not dried, are mixed with 100 ml of 1.5N NaOH in a 300 ml stirred autoclave and heated to 310° C. in 15 min. The mixture is then stirred at this temperature for 30 min and subsequently cooled to below 100° C. in 12 min. The solid product is removed from the solution, washed with $H_2O$ and dried at 115° C.

Under the scanning electron microscope, the pigment particles have smooth flat surfaces, and they have a mean particle diameter of 14.9 $\mu$. The L* values at 25° and 45° are 70.8 and 34.3, from which the luster value is calculated as 52.

EXAMPLES 3 TO 13

The pigment obtained in Stage 1 of Example 2 is treated with sodium hydroxide solution as described in the second stage of Example 2 but varying the concentration of the aqueous sodium hydroxide solution, the temperature and the holdup time at the selected temperature as shown in the table which follows. The resulting mean particle diameters and luster values are compiled in Table 1.

TABLE 1

| | cond. Experimental | | Temp. °C. | Holdup time h | Product charact. | |
|---|---|---|---|---|---|---|
| Example | N abs | * | | | Mean part. diam. in $\mu$ | Luster |
| 3 | 1.5 N | 0.5 | 230 | 0.5 | 3.9 | 26.8 |
| 4 | 2.0 N | 1.0 | 230 | 0.5 | 3.9 | 30.3 |
| 5 | 3.0 N | 2.0 | 230 | 0.5 | 4.0 | 32.2 |
| 6 | 1.5 N | 0.5 | 290 | 0.5 | 4.3 | 32.7 |
| 7 | 2.0 N | 1.0 | 290 | 0.5 | 4.5 | 35.0 |
| 8 | 3.0 N | 3.0 | 290 | 0.5 | 4.8 | 38.5 |
| 9 | 1.5 N | 0.5 | 330 | 0.5 | 5.5 | 40.8 |
| 10 | 2.0 N | 1.0 | 330 | 0.5 | 5.7 | 42.4 |
| 11 | 3.0 N | 2.0 | 330 | 0.5 | 5.7 | 43.3 |
| 12 | 1.5 N | 0.5 | 330 | 1.5 | 6.2 | 44.9 |
| 13 | 1.5 N | 0.5 | 330 | 3.5 | 6.4 | 45.6 |

*Increase in the normality of the alkali compared with the first stage

As is evident from the table, the particle diameter and thus the luster value increase as
(a) the difference between the sodium hydroxide solution concentrations in the two stages increases
(b) the temperature in the second stage increases and
(c) the holdup time in the second stage increases.

EXAMPLE 14 a) Stage 1

4600 l of an aqueous suspension containing 30.7 g/l $\alpha$-FeOOH are introduced into a 7 m³ stirred autoclave. The FeOOH in the suspension has a specific surface area (BET) of 115 m²/g. 139 kg of $\gamma$-$Al_2O_3$ and 231.9 kg of NaOH are added to the suspension, the alkali concentration then being 1.25 N.

The suspension is then heated, while stirring, to 45° C. in 5.5 hours and subsequently stirred at this temperature for 0.5 hours.

The suspension then contains hematite platelets which have the composition $Al_{0.17}Fe_{1.83}O_3$ as shown by analysis. Cilas measurements reveal that the mean particle diameter is 8.9 $\mu$. The L* values are 56.0 measured at 25° and 34.5 measured at 45°. The luster value calculated from these is 38.4.

b) Stage 2

50% strength NaOH is pumped into the suspension obtained in Stage 1 to increase the NaOH concentration to 60 g/l. The sodium hydroxide solution pumped in contains 31.6 g/l $\gamma$-$Al_2O_3$.

The suspension at 245° C. is cooled at a constant rate, while stirring, to 100° C. in 10 hours. Then 1 cbm of water is pumped into the vessel and the suspension is discharged. The product is filtered, washed first with 1 N NaOH at 80° C. and then with water, and dried at 110° C.

Examination of the resulting pigment particles under the scanning electron microscope showed smooth, flat surfaces free of asperities. The X-ray lines are typical of hematite. Chemical investigation of the pigment reveals that the composition is $Al_{0.17}Fe_{1.83}O_3$. The mean particle diameter is found to be 13.9 $\mu$. The L* values are 65.8 measured at 25° and 31.9 measured at 45°; the luster value calculated from these is 51.5.

EXAMPLE 15

10 g (based on dry matter) of the undried pigment obtained in Stage 1 of Example 2 are mixed with 140 g of 2 N NaOH solution and 1 g of waterglass (25.5 % $SiO_2$) in a 300 l stirred autoclave and heated to 330° C. in 30 min, then stirred at 330° C. for 30 min and subsequently cooled to 100° C. in 15 min. The solid product is filtered off, washed first with 1 N NaOH at 80° C. and then with $H_2O$ and dried at 120° C.

Scanning electron micrographs of the pigment show smooth platelet surfaces. The mean particle diameter is found to be 4.1 $\mu$. Analysis shows 2.7% Al, 62.9% Fe and 1% Si. The L* values measured at 25° C. and 45° are 65.2 and 44.9, from which the luster value is calculated as 31.1.

EXAMPLE 16

10 g of the pigment obtained in Stage 1 of Example 1 are stirred with 140 g of 1.5 N sodium hydroxide solution and 1 g of sodium chromate ($Na_2CrO_4 \times 4H_2O$) in a 300 ml autoclave while heating to 330° C. in 30 min. The mixture is then stirred at this temperature for 30 min and cooled to 100° C. in 15 min. The solid product is filtered off, washed first with 1 N NaOH at 80° C. and then with $H_2O$ and dried.

The pigment had a brownish yellow hue and is lustrous. Analysis reveals 0.19% Cr, 0.9% Al, 68.0% Fe. Scanning electron micrographs show that the pigment is in the form of platelets and that the individual particles have smooth flat surfaces. Measurements in a Cilas granulometer show that the mean particle diameter is 4.6 $\mu$. The luster value is calculated as 39.0. The color values measured at 45° are $C_{ab}$=24.0 and $H^o$=36.7.

EXAMPLES 17 TO 25

Examples 17 to 25 are carried out as in Example 16 but using other additives in place of chromate. The results are compiled in Table 2. The starting material in every case was the pigment obtained as in Stage 1 of Example 1.

TABLE 2

| Example No. | Addition 1 g each | Mean particle diameter | Luster value | L*25 | Color values L*45 | C*ab | H° | Found by analysis in the solid |
|---|---|---|---|---|---|---|---|---|
| 17 | $Na_2MoO_4 \times 2H_2O$ | 5.4 | 38.6 | 59.2 | 36.4 | 22.4 | 33.2 | Mo: 0.03% |
| 18 | $Na_2WO_4 \times 2H_2O$ | 5.5 | 40.5 | 58.0 | 34.5 | 18.9 | 33.7 | W: 0.12% |
| 19 | $Na_2HPO_4 \times 12H_2O$ | 5.6 | 37.1 | 60.8 | 38.2 | 28.0 | 37.8 | P: 0.1% |
| 20 | $KMnO_4$ | 4.2 | 30.8 | 64.0 | 44.3 | 21.7 | 46.4 | Mn: 3.0% |
| 21 | $TiOSO_4$ | 4.0 | 28.3 | 65.7 | 47.1 | 27.2 | 46.0 | Ti: 2.3% |
| 22 | $ZrSO_4 \times 4H_2O$ | 5.1 | 34.3 | 58.0 | 38.1 | 22.7 | 33.6 | Zr: 0.01% |
| 23 | $As_2O_3$ | 5.1 | 37.9 | 58.1 | 36.1 | 19.3 | 32.3 | As: 0.10% |
| 24 | $Sb_2O_3$ | 4.0 | 29.2 | 65.3 | 46.2 | 26.5 | 45.8 | Sb: 6.8% |
| 25 | $Na_2B_4O_7 \times 10H_2O$ | 5.8 | 38.7 | 58.1 | 35.6 | 21.0 | 33.6 | B: 0.03% |

We claim:

1. A process for producing $\alpha$-$Fe_2O_3$ (hematite) in the form of platelets by the hydrothermal treatment of an aqueous suspension containing from 1 to 20% by weight of iron(III) hydroxide or oxide hydrate solids in the presence of alkali metal hydroxide and of aluminum and/or silicon compounds, which comprises: carrying out the hydrothermal treatment in two stages at a temperature of from 150° to 360° C. and within a time of 1 minute to 40 hours, with the proviso that the normality of the alkali is from 0.2 to 2 N in the first stage and is increased by from 0.2 to 2.5 N in the second stage.

2. The process of claim 1, wherein the temperature in the first stage is from 170° to 360° C. and in the second stage is from 150° to 360° C.

3. The process of claim 1, wherein the hydrothermal treatment in the second stage is carried out in the presence of compounds, which are soluble in alkalis, of the elements silicon, aluminum, arsenic, antimony, boron, zirconium, phosphorus, titanium, chromium, manganese, molybdenum and tungsten.

4. The process of claim 1, wherein the second stage is carried out in the same vessel as the first stage.

* * * * *

UNITED STATES PATENT AND TRADEMARK OFFICE
CERTIFICATE OF CORRECTION

PATENT NO. : 5,244,649

DATED : September 14, 1993

INVENTOR(S) : OSTERTAG et al.

It is certified that error appears in the above-identified patent and that said Letters Patent is hereby corrected as shown below:

IN THE ABSTRACT

Line 6, "0 2" should read --0.2--.

Signed and Sealed this

Twenty-second Day of March, 1994

Attest:

BRUCE LEHMAN

Attesting Officer

Commissioner of Patents and Trademarks